(12) United States Patent
Casey et al.

(10) Patent No.: US 12,491,085 B2
(45) Date of Patent: Dec. 9, 2025

(54) SYSTEMS AND METHODS FOR ORTHOPEDIC IMPLANT FIXATION

(71) Applicant: Carlsmed, Inc., Carlsbad, CA (US)

(72) Inventors: Niall Patrick Casey, Carlsbad, CA (US); Michael J. Cordonnier, Carlsbad, CA (US)

(73) Assignee: Carlsmed, Inc., Carlsbad, CA (US)

( * ) Notice: Subject to any disclaimer, the term of this patent is extended or adjusted under 35 U.S.C. 154(b) by 473 days.

(21) Appl. No.: 17/875,699

(22) Filed: Jul. 28, 2022

(65) Prior Publication Data

US 2023/0052263 A1 Feb. 16, 2023

Related U.S. Application Data

(63) Continuation of application No. 16/352,699, filed on Mar. 13, 2019, now Pat. No. 11,432,943.
(Continued)

(51) Int. Cl.
*A61F 2/44* (2006.01)
*A61F 2/30* (2006.01)

(52) U.S. Cl.
CPC .......... *A61F 2/447* (2013.01); *A61F 2/30749* (2013.01); *A61F 2/442* (2013.01);
(Continued)

(58) Field of Classification Search
CPC ...... A61F 2/447; A61F 2/30749; A61F 2/442; A61F 2/4455; A61F 2/446; A61F 2/4465; A61F 2002/30115; A61F 2002/30125; A61F 2002/30131; A61F 2002/30143; A61F 2002/30146; A61F 2002/30166; A61F 2002/30261; A61F 2002/30579;
(Continued)

(56) References Cited

U.S. PATENT DOCUMENTS

| 4,704,686 A | 11/1987 | Aldinger |
| 4,936,862 A | 6/1990 | Walker et al. |

(Continued)

FOREIGN PATENT DOCUMENTS

| CN | 104318009 A | 1/2015 |
| CN | 104353121 A | 2/2015 |

(Continued)

OTHER PUBLICATIONS

International Search Report and Written Opinion for International Application No. PCT/US22/32624, mailed Oct. 28, 2022, 16 pages.
(Continued)

*Primary Examiner* — King Y Poon
*Assistant Examiner* — Patrick P Galera
(74) *Attorney, Agent, or Firm* — Perkins Coie LLP

(57) ABSTRACT

An interbody implant system for use in the spine includes a base comprising two or more bone contacting surfaces, at least one recess in at least one of the two or more bone contacting surfaces, the recess configured for containing a tooth, a deployable tooth to provide fixation between the base and the anatomy of a subject, a break-away bridge between the tooth and the base for providing a first relative position between the tooth and the base, and a locking mechanism for providing a second relative position between the tooth and the base.

15 Claims, 8 Drawing Sheets

Related U.S. Application Data

(60) Provisional application No. 62/643,046, filed on Mar. 14, 2018.

(52) U.S. Cl.
CPC ............ *A61F 2/4455* (2013.01); *A61F 2/446* (2013.01); *A61F 2/4465* (2013.01); *A61F 2002/30115* (2013.01); *A61F 2002/30125* (2013.01); *A61F 2002/30131* (2013.01); *A61F 2002/30143* (2013.01); *A61F 2002/30146* (2013.01); *A61F 2002/30166* (2013.01); *A61F 2002/30261* (2013.01); *A61F 2002/30579* (2013.01); *A61F 2002/30593* (2013.01); *A61F 2002/30784* (2013.01); *A61F 2002/3079* (2013.01)

(58) Field of Classification Search
CPC .. A61F 2002/30593; A61F 2002/30784; A61F 2002/3079
See application file for complete search history.

(56) References Cited

U.S. PATENT DOCUMENTS

| | | |
|---|---|---|
| 5,431,562 A | 7/1995 | Andreiko et al. |
| 5,514,180 A | 5/1996 | Heggeness et al. |
| D420,995 S | 2/2000 | Imamura |
| D436,580 S | 1/2001 | Navano |
| 6,315,553 B1 | 11/2001 | Sachdeva |
| 6,540,512 B1 | 4/2003 | Sachdeva |
| 6,696,073 B2 | 2/2004 | Boyce et al. |
| 6,772,026 B2 | 8/2004 | Bradbury |
| 6,932,842 B1 | 8/2005 | Litschko et al. |
| 6,978,188 B1 | 12/2005 | Christensen |
| 6,988,241 B1 | 1/2006 | Guttman |
| 7,174,282 B2 | 2/2007 | Hollister et al. |
| 7,187,790 B2 | 3/2007 | Sabol et al. |
| D548,242 S | 8/2007 | Viegers |
| D614,191 S | 4/2010 | Takano |
| 7,747,305 B2 | 6/2010 | Dean et al. |
| 7,756,314 B2 | 7/2010 | Karau et al. |
| 7,799,077 B2 | 9/2010 | Lang |
| D633,514 S | 3/2011 | Tokunaga |
| D656,153 S | 3/2012 | Imamura |
| 8,147,556 B2 | 4/2012 | Louis et al. |
| 8,246,680 B2 | 8/2012 | Betz |
| 8,265,949 B2 | 9/2012 | Haddad |
| 8,275,594 B2 | 9/2012 | Lin |
| 8,337,507 B2 | 12/2012 | Lang |
| 8,394,142 B2 | 3/2013 | Bertagnoli |
| 8,457,930 B2 | 6/2013 | Shroeder |
| 8,532,806 B1 | 9/2013 | Masson |
| 8,556,983 B2 | 10/2013 | Bojarski et al. |
| 8,644,568 B1 | 2/2014 | Hoffman |
| 8,735,773 B2 | 5/2014 | Lang |
| 8,758,357 B2 | 6/2014 | Frey |
| 8,775,133 B2 | 7/2014 | Schroeder |
| 8,781,557 B2 | 7/2014 | Dean |
| 8,843,229 B2 | 9/2014 | Vanasse |
| 8,855,389 B1 | 10/2014 | Hoffman |
| 8,870,889 B2 | 10/2014 | Frey |
| 9,020,788 B2 | 4/2015 | Lang |
| D735,231 S | 7/2015 | Omiya |
| D737,309 S | 8/2015 | Kito |
| 9,198,678 B2 | 12/2015 | Frey et al. |
| 9,208,558 B2 | 12/2015 | Dean |
| D757,025 S | 5/2016 | Kim |
| D761,842 S | 7/2016 | Johnson |
| 9,381,093 B1 | 7/2016 | Morris et al. |
| 9,411,939 B2 | 8/2016 | Furrer |
| 9,445,907 B2 | 9/2016 | Meridew |
| 9,452,050 B2 | 9/2016 | Miles et al. |
| D774,076 S | 12/2016 | Fuller |
| 9,542,525 B2 | 1/2017 | Arisoy et al. |
| 9,561,113 B2 | 2/2017 | Howard |
| 9,642,633 B2 | 5/2017 | Frey et al. |
| 9,693,831 B2 | 7/2017 | Mosnier et al. |
| 9,707,058 B2 | 7/2017 | Bassett |
| 9,715,563 B1 | 7/2017 | Schroeder |
| D797,760 S | 9/2017 | Tsujimura |
| D797,766 S | 9/2017 | Ibsies |
| D798,312 S | 9/2017 | Tsujimura |
| 9,757,245 B2 | 9/2017 | O'Neil et al. |
| D798,894 S | 10/2017 | Ibsies |
| 9,775,680 B2 | 10/2017 | Bojarski et al. |
| 9,782,228 B2 | 10/2017 | Mosnier et al. |
| D812,628 S | 3/2018 | Okado |
| 9,993,341 B2 | 6/2018 | Vanasse |
| 10,034,676 B2 | 7/2018 | Donner |
| D825,605 S | 8/2018 | Jann |
| D826,977 S | 8/2018 | Nakajima |
| 10,089,413 B2 | 10/2018 | Wirx-Speetjens et al. |
| 10,105,238 B2 | 10/2018 | Koch et al. |
| D841,675 S | 2/2019 | Hoffman |
| 10,213,311 B2 | 2/2019 | Mafhouz |
| D845,973 S | 4/2019 | Jaycobs |
| D845,974 S | 4/2019 | Cooperman |
| D847,165 S | 4/2019 | Kolbenheyer |
| D848,468 S | 5/2019 | Ng |
| D849,029 S | 5/2019 | Cooperman |
| D849,773 S | 5/2019 | Jiang |
| 10,292,770 B2 | 5/2019 | Ryan |
| 10,299,863 B2 | 5/2019 | Grbic et al. |
| D854,560 S | 7/2019 | Field |
| D854,561 S | 7/2019 | Field |
| 10,390,958 B2 | 8/2019 | Maclennan |
| D860,237 S | 9/2019 | Li |
| D860,238 S | 9/2019 | Bhardwaj |
| D866,577 S | 11/2019 | Eisert |
| D867,379 S | 11/2019 | Ang |
| D867,389 S | 11/2019 | Jamison |
| 10,463,433 B2 | 11/2019 | Turner et al. |
| D870,762 S | 12/2019 | Mendoza |
| 10,512,546 B2 | 12/2019 | Kamer et al. |
| 10,517,681 B2 | 12/2019 | Roh et al. |
| D872,117 S | 1/2020 | Kobayashi |
| D872,756 S | 1/2020 | Howell |
| D874,490 S | 2/2020 | Dodsworth |
| D875,761 S | 2/2020 | Heffernan |
| D876,454 S | 2/2020 | Knowles |
| D876,462 S | 2/2020 | Li |
| D877,167 S | 3/2020 | Knowles |
| D879,112 S | 3/2020 | Hejazi |
| 10,588,589 B2 | 3/2020 | Bregman-Amitai et al. |
| 10,603,055 B2 | 3/2020 | Donner et al. |
| D880,513 S | 4/2020 | Wang |
| D881,908 S | 4/2020 | Sunil |
| D881,910 S | 4/2020 | Lin |
| 10,621,289 B2 | 4/2020 | Schroeder |
| 10,631,988 B2 | 4/2020 | Arnold et al. |
| D884,008 S | 5/2020 | Thornberg |
| 10,646,236 B2 | 5/2020 | Donner et al. |
| 10,646,258 B2 | 5/2020 | Donner et al. |
| 10,736,698 B2 | 8/2020 | Bohl |
| 10,751,188 B2 | 8/2020 | Guo et al. |
| D896,825 S | 9/2020 | Abel |
| D896,828 S | 9/2020 | Linares |
| D898,054 S | 10/2020 | Everhart |
| D899,438 S | 10/2020 | Crafts |
| 10,806,597 B2 | 10/2020 | Sournac et al. |
| 10,902,944 B1 | 1/2021 | Casey et al. |
| D916,868 S | 4/2021 | Evangeliou |
| D916,879 S | 4/2021 | Mitsumori |
| D918,253 S | 5/2021 | Choe |
| 11,000,334 B1 | 5/2021 | Young |
| D921,675 S | 6/2021 | Kmak |
| D921,677 S | 6/2021 | Kmak |
| D921,687 S | 6/2021 | Kmak |
| D924,909 S | 7/2021 | Nasu |
| D925,567 S | 7/2021 | Hayamizu |
| D927,528 S | 8/2021 | Heisler |
| 11,083,586 B2 | 8/2021 | Cordonnier |
| 11,112,770 B2 | 9/2021 | Roh et al. |

(56) References Cited

U.S. PATENT DOCUMENTS

| | | | |
|---|---|---|---|
| D933,692 S | 10/2021 | Smith | |
| 11,166,764 B2 | 11/2021 | Roh et al. | |
| D937,870 S | 12/2021 | Pinto | |
| D937,876 S | 12/2021 | Harvey | |
| D938,461 S | 12/2021 | Hoffman | |
| D938,986 S | 12/2021 | Grossberg | |
| D940,178 S | 1/2022 | Ang | |
| D946,022 S | 3/2022 | Nuttbrown | |
| D946,023 S | 3/2022 | Nuttbrown | |
| D946,024 S | 3/2022 | Vogler-Ivashchanka | |
| D946,616 S | 3/2022 | Tsai | |
| D958,151 S | 7/2022 | Casey et al. | |
| 11,376,076 B2 | 7/2022 | Casey et al. | |
| 11,432,943 B2 | 9/2022 | Casey et al. | |
| 11,439,514 B2 | 9/2022 | Casey et al. | |
| 12,245,952 B2 | 3/2025 | Casey et al. | |
| 2002/0016595 A1 | 2/2002 | Michelson | |
| 2004/0104512 A1 | 6/2004 | Eidenschink | |
| 2004/0210314 A1 | 10/2004 | Michelson | |
| 2005/0049590 A1* | 3/2005 | Alleyne | A61F 2/442 606/279 |
| 2007/0276501 A1 | 11/2007 | Betz | |
| 2008/0089566 A1 | 4/2008 | Node-Langlois | |
| 2008/0227047 A1 | 9/2008 | Lowe | |
| 2009/0062739 A1 | 3/2009 | Anderson | |
| 2010/0298942 A1 | 11/2010 | Hansell | |
| 2010/0324692 A1 | 12/2010 | Uthgenannt | |
| 2012/0150243 A9 | 6/2012 | Crawford et al. | |
| 2012/0322018 A1 | 12/2012 | Lowe | |
| 2013/0079680 A1 | 3/2013 | Stein et al. | |
| 2013/0323669 A1 | 12/2013 | Lowe | |
| 2014/0072608 A1 | 3/2014 | Karagkiozaki | |
| 2014/0074438 A1 | 3/2014 | Furrer | |
| 2014/0081659 A1 | 3/2014 | Nawana et al. | |
| 2014/0086780 A1 | 3/2014 | Miller | |
| 2014/0100886 A1 | 4/2014 | Woods | |
| 2014/0164022 A1 | 6/2014 | Reed | |
| 2014/0263674 A1 | 9/2014 | Cerveny | |
| 2014/0277487 A1 | 9/2014 | Davenport et al. | |
| 2014/0350614 A1 | 11/2014 | Frey | |
| 2015/0079533 A1 | 3/2015 | Lowe | |
| 2015/0105891 A1 | 4/2015 | Golway et al. | |
| 2015/0199488 A1 | 7/2015 | Falchuk | |
| 2015/0213225 A1 | 7/2015 | Amarasingham | |
| 2015/0305878 A1* | 10/2015 | O'Neil | A61F 2/442 29/428 |
| 2015/0324490 A1 | 11/2015 | Page | |
| 2015/0328004 A1 | 11/2015 | Mafhouz | |
| 2015/0332018 A1 | 11/2015 | Rosen | |
| 2016/0001039 A1 | 1/2016 | Armour et al. | |
| 2016/0015465 A1 | 1/2016 | Steines et al. | |
| 2016/0030067 A1 | 2/2016 | Frey et al. | |
| 2016/0074048 A1 | 3/2016 | Pavlovskaia | |
| 2016/0117817 A1 | 4/2016 | Seel | |
| 2016/0143744 A1 | 5/2016 | Bojarski et al. | |
| 2016/0184054 A1 | 6/2016 | Lowe | |
| 2016/0210374 A1 | 7/2016 | Mosnier et al. | |
| 2016/0217268 A1 | 7/2016 | Otto | |
| 2016/0242857 A1 | 8/2016 | Scholl | |
| 2016/0300026 A1 | 10/2016 | Bogoni et al. | |
| 2016/0354039 A1 | 12/2016 | Soto et al. | |
| 2016/0354161 A1 | 12/2016 | Deitz | |
| 2016/0354213 A1 | 12/2016 | Cowan | |
| 2016/0378919 A1 | 12/2016 | McNutt et al. | |
| 2017/0000566 A1 | 1/2017 | Gordon | |
| 2017/0014169 A1 | 1/2017 | Dean | |
| 2017/0020679 A1 | 1/2017 | Maclennan | |
| 2017/0035514 A1 | 2/2017 | Fox et al. | |
| 2017/0061375 A1 | 3/2017 | Laster | |
| 2017/0068792 A1 | 3/2017 | Reiner | |
| 2017/0135706 A1 | 5/2017 | Frey et al. | |
| 2017/0143494 A1 | 5/2017 | Mahfouz | |
| 2017/0143831 A1 | 5/2017 | Varanasi et al. | |
| 2017/0216047 A1 | 8/2017 | Hawkes et al. | |
| 2017/0220740 A1 | 8/2017 | D'Urso | |
| 2017/0252107 A1 | 9/2017 | Turner et al. | |
| 2017/0262595 A1 | 9/2017 | Vorhis | |
| 2017/0340447 A1 | 11/2017 | Mahfouz | |
| 2017/0354510 A1 | 12/2017 | O'Neil et al. | |
| 2017/0367645 A1 | 12/2017 | Klinder | |
| 2018/0008349 A1 | 1/2018 | Gillman | |
| 2018/0113992 A1 | 4/2018 | Eltorai et al. | |
| 2018/0116727 A1 | 5/2018 | Caldwell et al. | |
| 2018/0168499 A1 | 6/2018 | Bergold | |
| 2018/0168731 A1 | 6/2018 | Reid | |
| 2018/0185075 A1 | 7/2018 | She | |
| 2018/0233222 A1 | 8/2018 | Daley | |
| 2018/0233225 A1 | 8/2018 | Experton | |
| 2018/0250075 A1 | 9/2018 | Cho | |
| 2018/0301213 A1* | 10/2018 | Zehavi | G06T 7/73 |
| 2018/0303552 A1 | 10/2018 | Ryan | |
| 2018/0303616 A1 | 10/2018 | Bhattacharyya et al. | |
| 2018/0308569 A1 | 10/2018 | Luellen | |
| 2018/0318100 A1 | 11/2018 | Altarac | |
| 2018/0338841 A1 | 11/2018 | Miller et al. | |
| 2019/0029842 A1 | 1/2019 | Xiao et al. | |
| 2019/0065685 A1 | 2/2019 | Pickover | |
| 2019/0105170 A1 | 4/2019 | Wang et al. | |
| 2019/0201106 A1 | 7/2019 | Siemionow | |
| 2019/0262084 A1 | 8/2019 | Roh et al. | |
| 2019/0266597 A1 | 8/2019 | Mohtar | |
| 2019/0328929 A1 | 10/2019 | Kugler et al. | |
| 2019/0333622 A1 | 10/2019 | Levin | |
| 2019/0354693 A1 | 11/2019 | Yoon | |
| 2019/0380792 A1 | 12/2019 | Poltaretskyi et al. | |
| 2020/0021570 A1 | 1/2020 | Lin | |
| 2020/0078180 A1 | 3/2020 | Casey et al. | |
| 2020/0085509 A1 | 3/2020 | Roh et al. | |
| 2020/0170802 A1 | 6/2020 | Casey et al. | |
| 2020/0246162 A1 | 8/2020 | Schultz et al. | |
| 2020/0261156 A1 | 8/2020 | Schmidt | |
| 2020/0289288 A1 | 9/2020 | Müller et al. | |
| 2020/0315708 A1 | 10/2020 | Mosnier et al. | |
| 2020/0323654 A1 | 10/2020 | Marrapode | |
| 2021/0015524 A1 | 1/2021 | Montello et al. | |
| 2021/0059822 A1 | 3/2021 | Casey et al. | |
| 2021/0064605 A1 | 3/2021 | Balint | |
| 2021/0068975 A1 | 3/2021 | Choi et al. | |
| 2021/0085482 A1 | 3/2021 | Flickinger et al. | |
| 2021/0145519 A1 | 5/2021 | Mosnier et al. | |
| 2021/0210189 A1 | 7/2021 | Casey et al. | |
| 2021/0287770 A1 | 9/2021 | Anderson | |
| 2021/0382457 A1 | 12/2021 | Roh et al. | |
| 2022/0000625 A1 | 1/2022 | Cordonnier | |
| 2022/0006642 A1 | 1/2022 | Maj et al. | |
| 2022/0039965 A1 | 2/2022 | Casey et al. | |
| 2022/0047402 A1 | 2/2022 | Casey et al. | |
| 2022/0110686 A1 | 4/2022 | Roh et al. | |
| 2022/0160405 A1 | 5/2022 | Casey et al. | |
| 2022/0160518 A1 | 5/2022 | Casey et al. | |

FOREIGN PATENT DOCUMENTS

| | | |
|---|---|---|
| CN | 204468348 U | 7/2015 |
| CN | 105796214 A | 7/2016 |
| CN | 106202861 | 12/2016 |
| CN | 107220933 | 9/2017 |
| CN | 108670506 A | 10/2018 |
| CN | 110575289 A | 12/2019 |
| CN | 111281613 A | 6/2020 |
| CN | 112155792 A | 1/2021 |
| CN | 113643790 | 11/2021 |
| EP | 3120796 A1 | 1/2017 |
| WO | 9507509 A1 | 3/1995 |
| WO | 2004110309 A2 | 12/2004 |
| WO | 2010151564 A1 | 12/2010 |
| WO | 2012154534 A1 | 11/2012 |
| WO | 2014180972 A2 | 11/2014 |
| WO | 2016172694 A1 | 10/2016 |
| WO | 2019018013 A1 | 1/2019 |
| WO | 2019112917 A1 | 6/2019 |
| WO | 2019148154 A1 | 8/2019 |
| WO | 2019165152 A1 | 8/2019 |
| WO | 2019241167 A1 | 12/2019 |

(56) References Cited

FOREIGN PATENT DOCUMENTS

| WO | 2021061662 A1 | 4/2021 |
|---|---|---|
| WO | 2022045956 A1 | 3/2022 |
| WO | 2022109097 A1 | 5/2022 |
| WO | 2022261171 A1 | 12/2022 |
| WO | 2022266313 A1 | 12/2022 |
| WO | 2023034405 A1 | 3/2023 |

OTHER PUBLICATIONS

International Search Report and Written Opinion for International Application No. PCT/US22/33775, mailed Sep. 8, 2022, 17 pages.
Endo, Kenji et al. "Measurement of whole spine sagittal alignment using the SLOT radiography of the SONIALVISION safire series clinical application." Medical Now, No. 78; Aug. 2015, 4 pages.
Eshkalak, S.K. et al., "The role of three-dimensional printing in healthcare and medicine." Materials and Design 194, Jul. 10, 20202, 15 pages.
Extended European Search Report for European Application No. 18885367.5, mailed Aug. 16, 2021, 8 pages.
Extended European Search Report for European Application No. 19859930.0, mailed Jun. 22, 2022, 7 pages.
International Search Report and Written Opinion for International Application No. PCT/US19/50885, mailed Jan. 28, 2020, 21 pages.
International Search Report and Written Opinion for International Application No. PCT/US19/63855, mailed Feb. 14, 2020, 15 pages.
International Search Report and Written Opinion for International Application No. PCT/US21/44878, mailed Nov. 16, 2021, 18 pages.
International Search Report and Written Opinion for International Application No. PCT/US21/45503, mailed Jan. 11, 2022, 19 pages.
International Search Report and Written Opinion for International Patent Application No. PCT/US21/60074, mailed Mar. 17, 2022, 21 pages.
International Search Report and Written Opinion for International Patent Application No. PCT/US2018/063530, mailed Feb. 12, 2019, 16 pages.
International Search Report and Written Opinion for International Patent Application No. PCT/US21/12065, mailed Apr. 29, 2021, 19 pages.
International Search Report and Written Opinion for International Patent Application No. PCT/US21/59837, mailed Feb. 7, 2022, 19 pages.
Majdouline et al., "Preoperative assessment and evaluation of instrumentation strategies for the treatment of adolescent idiopathic scoliosis: computer simulation and optimization." Scoliosis 7, 21 (2012), pp. 1-8.
Materialise Mimics, "Efficiently turn scans into accurate virtual 3D models," Retrieved on Nov. 1, 2019 at www.materialize.com/en/medical/software/mimics, 1 page.
Pimenta, Dr. Luiz, "Current Surgical Strategies to Restore Proper Sagittal Alignment," Journal of Spine 2015, vol. 4, Issue 4, 2 pages.
Pruthi, G. et al., "Comprehensive review of guidelines to practice prosthodontic and implant procedures during COVID-19 pandemic." Journal of Oral Biology and Craniofacial Research 10, Oct. 17, 2020, 8 pages.
U.S. Appl. No. 15/958,409 for Ryan filed Apr. 21, 2017.
U.S. Appl. No. 17/463,054 for Casey et al., filed Aug. 31, 2021.
U.S. Appl. No. 17/518,524 for Cordonnier, filed Nov. 3, 2021.
U.S. Appl. No. 17/678,874 for Cordonnier, filed Feb. 23, 2022.
U.S. Appl. No. 17/702,591 for Roh et al., filed Mar. 23, 2022.
U.S. Appl. No. 17/835,777 for Cordonnier, filed Jun. 8, 2022.
U.S. Appl. No. 17/838,727 for Casey et al., filed Jun. 13, 2022.
U.S. Appl. No. 17/842,242 for Cordonnier, filed Jun. 16, 2022.
U.S. Appl. No. 17/851,487 for Cordonnier, filed, Jun. 28, 2022.
U.S. Appl. No. 17/856,625 for Cordonnier, filed, Jul. 1, 2022.
U.S. Appl. No. 17/867,621 for Cordonnier, filed, Jul. 18, 2022.
U.S. Appl. No. 17/878,633 for Cordonnier, filed, Aug. 1, 2022.
U.S. Appl. No. 17/880,277 for Casey et al., filed, Aug. 3, 2022.
International Search Report and Written Opinion for International Application No. PCT/US24/10202, mailed Jul. 16, 2024, 14 pages.
Extended European Search Report for European Application No. 22825810.9, mailed Mar. 10, 2025, 10 pages.
Partial Supplementary European Search Report mailed Feb. 21, 2025 for European Application No. 22820936.7, 14 pages.
Extended European Search Report mailed May 13, 2025, for European Application No. 22820936.7, 13 pages.

\* cited by examiner

SYSTEMS AND METHODS FOR ORTHOPEDIC IMPLANT FIXATION

CROSS-REFERENCE TO RELATED APPLICATION(S)

This application is a continuation of U.S. patent application Ser. No. 16/352,699, filed on Mar. 13, 2019 (now U.S. Pat. No. 11,432,943), which claims the benefit of U.S. Provisional Patent Application No. 62/643,046, filed on Mar. 14, 2018, which are incorporated herein by reference in their entireties for all purposes.

TECHNICAL FIELD

The field of the invention generally relates to orthopedic implants, including spinal implants, and methods for designing and producing them.

BACKGROUND

Orthopedic implants are used to correct a variety of different maladies. Orthopedic surgery utilizing orthopedic implants may include one of a number of specialties, including: hand surgery, shoulder and elbow surgery, total joint reconstruction (arthroplasty), skull reconstruction, pediatric orthopedics, foot and ankle surgery, spine surgery, musculoskeletal oncology, surgical sports medicine, and orthopedic trauma. Spine surgery may encompass one or more of the cervical, thoracic, lumbar spine, or the sacrum, and may treat a deformity or degeneration of the spine, or related back pain, leg pain, or other body pain. Irregular spinal curvature may include scoliosis, lordosis, or kyphosis (hyper or hypo), and irregular spinal displacement may include spondylolisthesis. Other spinal disorders include osteoarthritis, lumbar degenerative disc disease or cervical degenerative disc disease, lumbar spinal stenosis or cervical spinal stenosis.

Spinal fusion surgery may be performed to set and hold purposeful changes imparted on the spine. Spinal fusion procedures include PLIF (posterior lumbar interbody fusion), ALIF (anterior lumbar interbody fusion), TLIF (transverse or transforaminal lumbar interbody fusion), or LLIF (lateral lumbar interbody fusion), including DLIF (direct lateral lumbar interbody fusion) or XLIF (extreme lateral lumbar interbody fusion).

One goal of interbody fusion is to grow bone between vertebra in order to seize (e.g., lock) the spatial relationships in a position that provides enough room for neural elements, including exiting nerve roots. An interbody implant (interbody device, interbody implant, interbody cage, fusion cage, or spine cage) is a prosthesis used in spinal fusion procedures to maintain relative position of vertebra and establish appropriate foraminal height and decompression of exiting nerves. Each patient may have individual or unique disease characteristics, but most implant solutions include implants (e.g., interbody implants) having standard sizes or shapes (stock implants).

SUMMARY

In an embodiment of the present disclosure, an interbody implant system for use in the spine includes a base having two or more bone contacting surfaces, at least one recess in at least one of the two or more bone contacting surfaces, the recess configured for containing a tooth, a deployable tooth to provide fixation between the base and the anatomy of a subject, a break-away bridge between the tooth and the base for providing a first relative position between the tooth and the base, and a locking mechanism for providing a second relative position between the tooth and the base.

In another embodiment of the present disclosure, a method for implanting an implant within the spine of a subject includes providing an interbody implant system for use in the spine includes a base having two or more bone contacting surfaces, at least one recess in at least one of the two or more bone contacting surfaces, the recess configured for containing a tooth, a deployable tooth to provide fixation between the base and the anatomy of a subject, a break-away bridge between the tooth and the base for providing a first relative position between the tooth and the base, and a locking mechanism for providing a second relative position between the tooth and the base, inserting the interbody implant between two vertebrae of the spine of the subject with the tooth and the base in the first relative position, and moving the tooth and the base into the second relative position.

DETAILED DESCRIPTION

An interbody implant and an efficient method of producing the patient-specific implant are described in the embodiments herein. Implants according to embodiments described herein may include interbody implants or fusion cages. The interbody implants are typically intended to be placed between two vertebral bodies. Oftentimes, the intervertebral disc is removed prior to the placement of the interbody implant. The lower side of an interbody implant is intended to abut at least a portion of an upper side (endplate) of a first vertebral body and the upper side of the interbody implant is intended to abut at least a portion of a lower side (endplate) of a second vertebral body.

Insufficient contact and load transfer between the vertebral body and the interbody implant can produce inadequate fixation and can allow the cage to move relative to the vertebral body. Furthermore, insufficient contact area or fixation between the interbody implant and the vertebral bodies can result in micro-motions and/or macro-motions that can reduce the opportunity for bone growth and fusion to occur. If enough motion occurs, expulsion of the interbody implant can result.

Presently, fixation elements (including teeth, barbs, or screws) can be used to provide fixation of the interbody implant to the adjacent vertebral bodies. These fixation elements can be static features, such as teeth, on the opposing surfaces of the interbody that are designed to contact the vertebral endplates. Additionally, screws or barbs can be delivered following delivery and placement of the interbody implant. In these cases, these screws and barbs are driven through openings in the interbody implant and into the adjacent vertebral bodies. Each of these elements and features are designed to create fixation between the implant and adjacent anatomy.

Low bone mineral density index, overaggressive discectomies, or decortications of the endplate can reduce the strength of the anatomic endplate and reduce the ability to provide sufficient fixation to the interbody implant and reduce the transfer load from one vertebral body to another. To reduce or eliminate these risks, surgeons carefully prepare the opposing vertebral endplates. The surgeon aims to insert an interbody implant having as large a footprint (coverage area) as possible, in order to maximize the contact surface between implant and anatomy. When appropriate, the surgeon also places the interbody implant on the apophyseal rings to provide as much support and load transfer as possible for spinal distraction. The surgeon must also ensure the interbody implant is securely positioned within the disc space.

Figure 1:
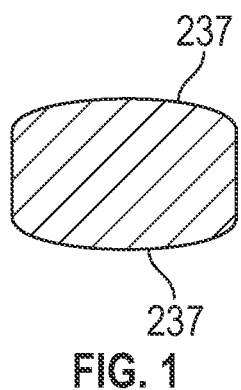
FIGS. 1-22 illustrate a variety of implants configured as intervertebral bodies and spacers, bone plates, pins, dowels, and the like, according to embodiments of the present disclosure.
Figure 2:
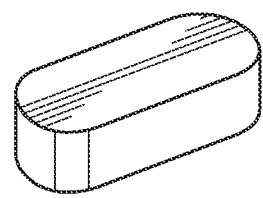
Figure 3:
Figure 4:
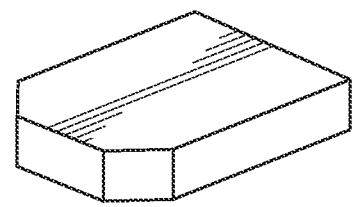
Figure 5:
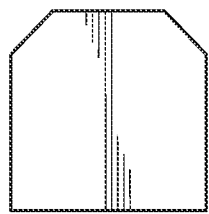
Figure 6:
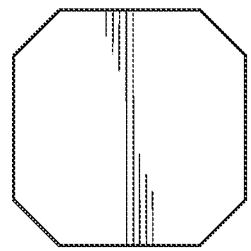
Figure 7:
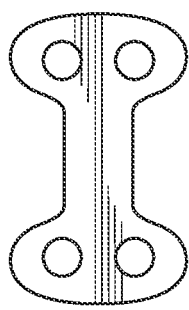
Figure 8:
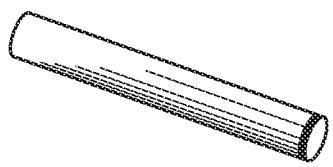
Figure 9:
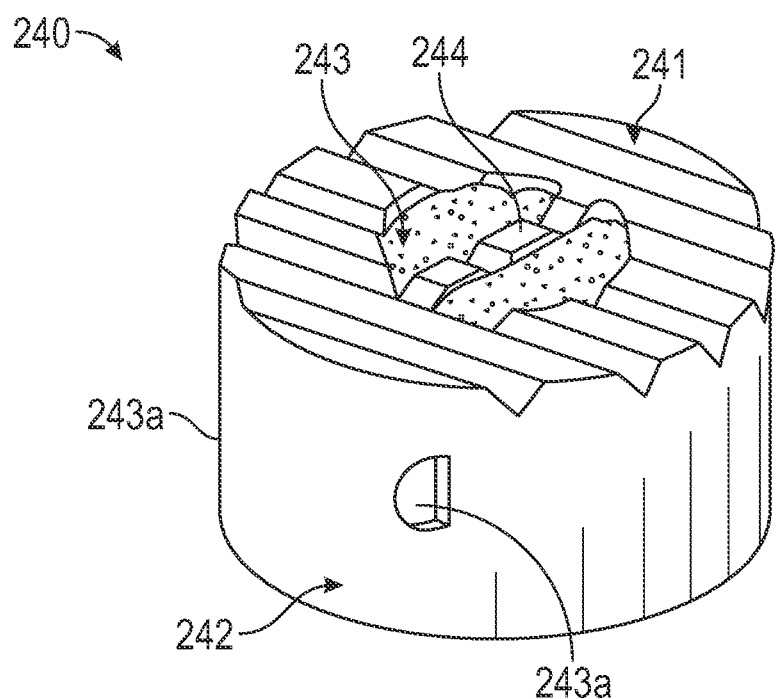
Figure 10:
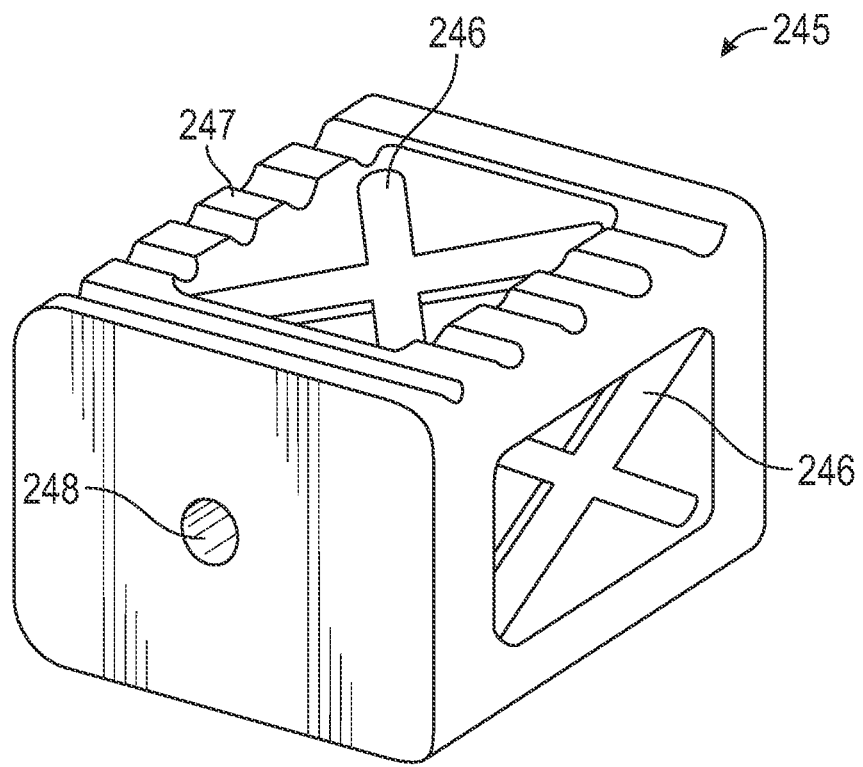
Figure 11:
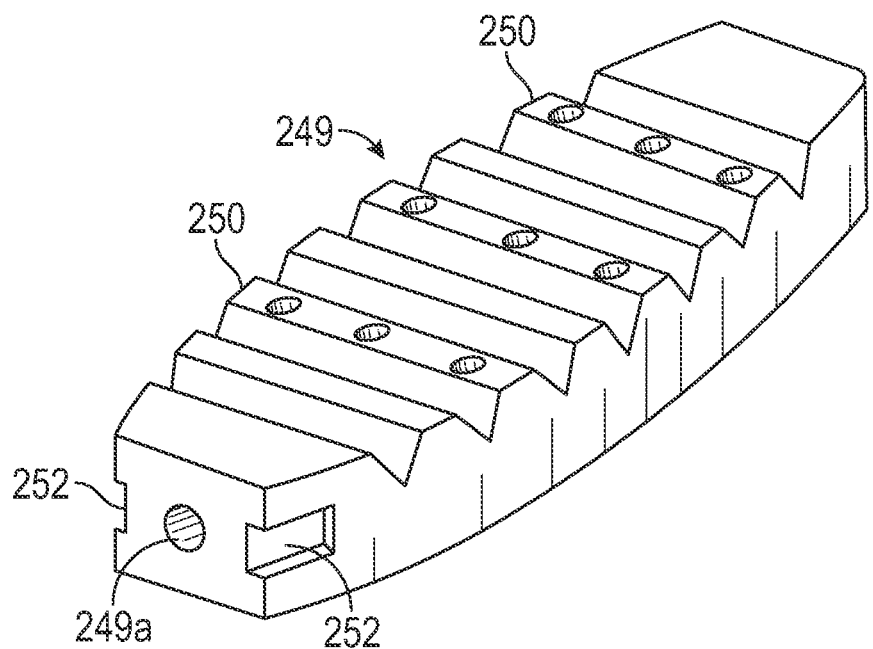

FIGS. 1-22 illustrate a variety of implants which may be produced by the systems and methods described herein, according to several embodiments of the present disclosure. FIG. 1 illustrates an intervertebral implant possessing biconvex surfaces 237 which are configured to match the curvatures of the vertebral endplates with which they come into contact. The biconvex surfaces 237 may each curve laterally (left to right), or curve anteriorly-posteriorly, or curve both laterally and anteriorly-posteriorly (e.g., a hemisphere or other three-dimensional convex shape). FIGS. 2-6 show various views of implants that are suitable for interbody use, including the oval footprints of FIGS. 2-3, the hexagonal footprints of FIGS. 4-5, or the octagonal footprint of FIG. 6. In some embodiments, other polygonal footprints may be utilized. In some embodiments, the footprint may comprise sides that are equal in length to each other, or in other embodiments, none of the sides may be equal in length to each other. FIG. 7 shows a cervical bone plate for the fixation of adjacent cervical vertebrae. The bone plate spans two or more vertebrae, but does not necessarily fill the space between two vertebral endplates. The size and shape of the bone plate of FIG. 7, including the location of the holes for screws, may be configured to maintain the cervical vertebrae in a particular relation to each other. FIG. 8 illustrates a cylindrical pin or dowel which may be keyed (not shown) to facilitate its installation. FIG. 9 illustrates an intervertebral implant 240 having a textured surface 241, e.g., roughenings, knurlings, ridges, and the like, to resist backing-out of the implant following its insertion in the intervertebral space. Surfaces 241 may converge to provide an anterior ramp configuration possessing a suitable lordotic angle or the surfaces may be essentially flat. The outer profile 242 of the implant can be round, oval, square, diamond-shaped, octagonal, hexagonal, etc., as requirements suggest. The implant can be provided with an opening 243 for receiving a quantity of osteogenic/osteoinductive material and/or a rigid reinforcing member 244 for added strength. The walls of the implant possess a pair of inserter instrument interfaces 243a (only one shown) for engagement with one end of an insertion tool. FIG. 10 depicts an open, or cage-like, structure 245 suitable for use as an anterior or posterior intervertebral implant. Cross braces 246 on one or more sides of the implant provide increased structural strength over that of a totally open configuration. The open space can be advantageously filled with an osteogenic/osteoinducting material. Texturized surfaces, e.g., ridges, 247 are provided to resist backing-out of the implant following its installation. Inserter interface 248 is intended to receive the distal (working end) of an implant insertion tool. FIG. 11 illustrates an intervertebral implant 249 possessing a position-retaining textured surface 250 (ridges) and a pattern of orifices communicating with the interior which possesses a void structure. The sides of the implant at one end thereof have a matching pair of implant inserter interfaces 252 which are intended to be grasped by an insertion tool. One end of the implant possesses an orifice 249a through which an osteogenic/osteoinductive material can be introduced into the interior void communicating channels of the implant.

Figure 12:
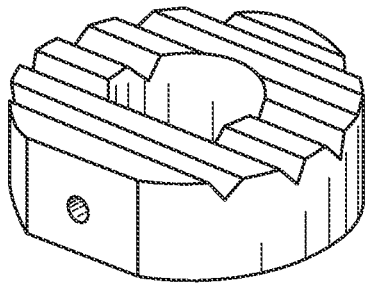
Figure 13:
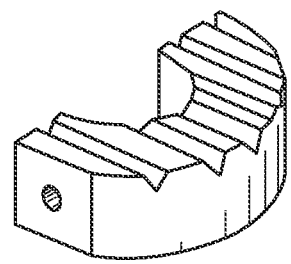
Figure 14:
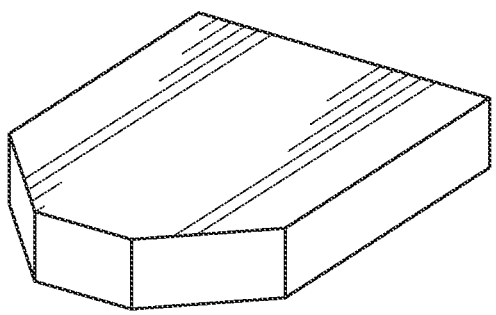
Figure 15:
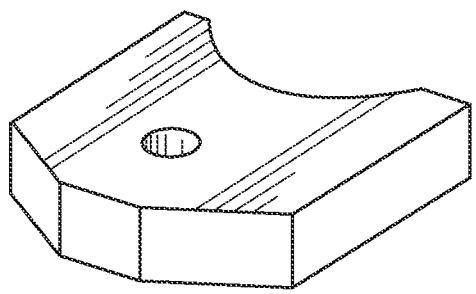
Figure 16:
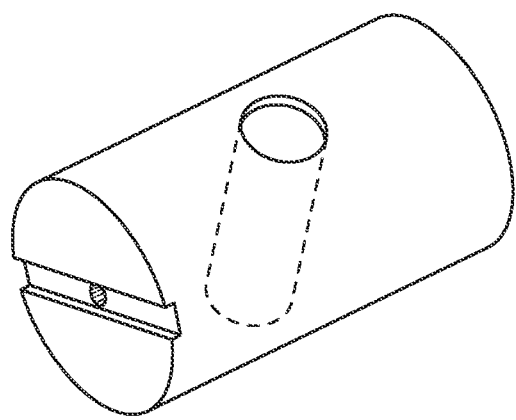
Figure 17:
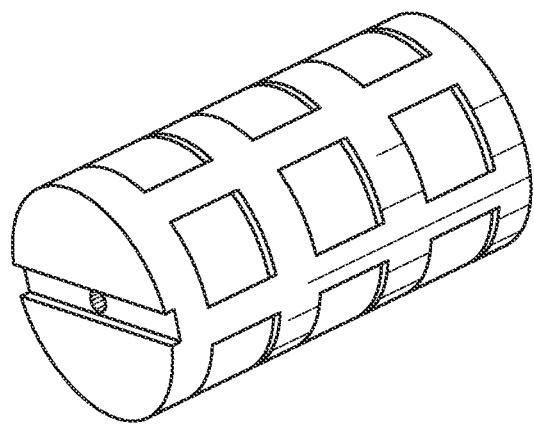
Figure 18:
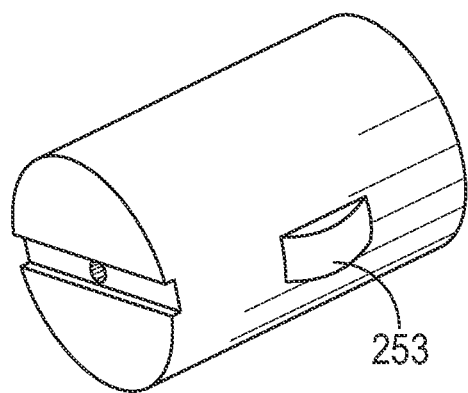
Figure 19:
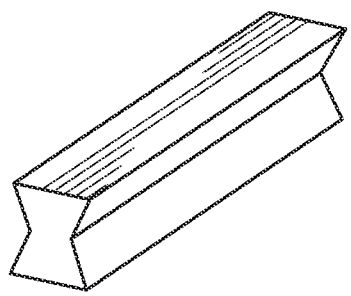
Figure 19:
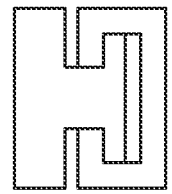
Figure 19:
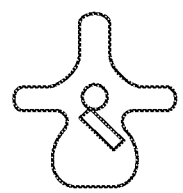
Figure 19:
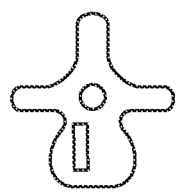
Figure 19:
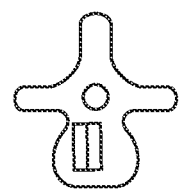
Figure 19:
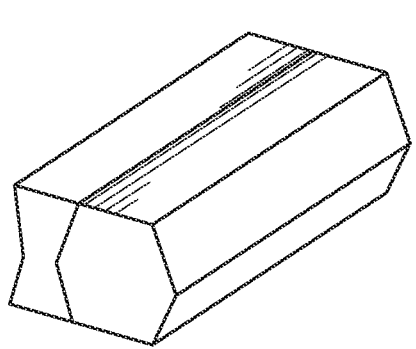
Figure 19:
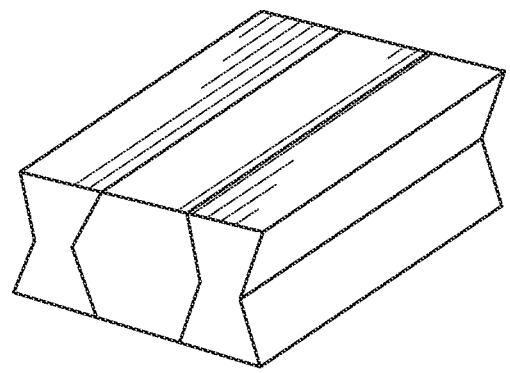
Figure 20:
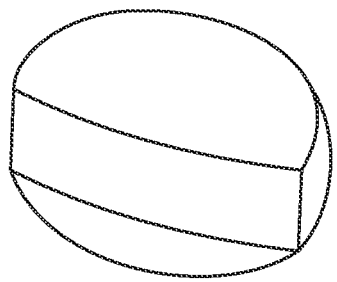
Figure 21:
Figure 22:
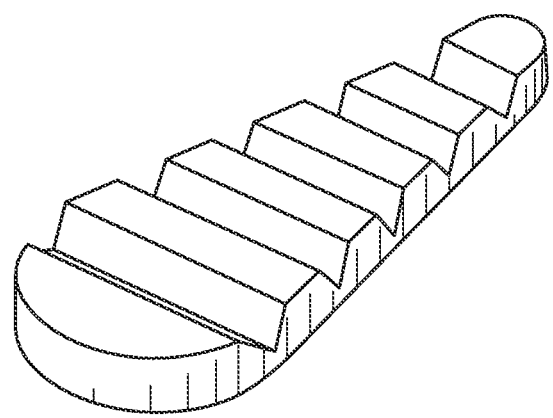

FIGS. 12-15 show various additional configurations of implants for insertion in the intervertebral space: FIG. 12 (an anterior ramp implant), FIG. 13 (a posterior ramp implant), FIG. 14 (a cervical spacer) and FIG. 15 (a cervical spacer including a radiused recess at one side). FIGS. 16-18 show various implants configured as intervertebral dowels. The implant of FIG. 16 is a solid structure with a through bore for receiving osteogenic/osteoinductive material. The implant of FIG. 17 possesses an open, or cage-like, structure which can be packed with osteogenic/osteoinductive material. The implant of FIG. 18 possesses at least one wing-like structure 253 on its longitudinal surface which prevents rotational displacement within the intervertebral space. Each of implants 16-18 possesses a slot and hole for receiving the distal end of an insertion tool. FIG. 19 illustrates a transforaminal lumbar interbody fusion (TLIF) implant and its assembly from subunits. The implant of FIG. 19 may alternatively be used as a posterior lumbar interbody fusion (PLIF) implant. FIG. 20 depicts a convex anterior interbody ramp with openings communicating with the interior. FIG. 21 shows another embodiment of anterior interbody implant. FIG. 22 shows a solid anterior interbody implant presenting a large surface area for implant-vertebral endplate contact.

Figure 23:
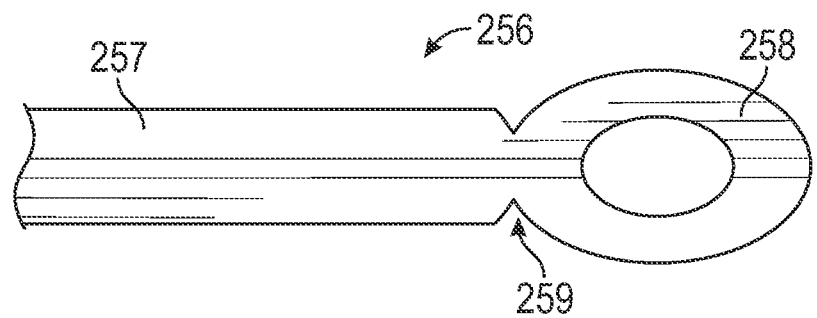
FIG. 23 illustrates the distal end of an integral implant insertion instrument and implant, according to an embodiment of the present disclosure.

FIG. 23 schematically illustrates in plan view the distal end 257 of an integral, or combined, implant insertion instrument and implant 256 wherein implant portion 258 specifically, an intervertebral implant, is joined to the distal end 257 of the instrument portion through a weakened, or break-away, site of attachment 259. Following insertion of the intervertebral implant in the intervertebral space, application of a sharp upward or downward movement of the implant insertion instrument will result in the distal end of the instrument cleanly breaking away, and separating from, the implant which remains in place. Alternatively, the site of attachment 259 may comprise any mechanism that allows the distal end 257 to releasably grip or maintain the implant 258, including, but not limited to: a clamp, an adhesive, epoxy, or hot melt attachment, a magnetic connection, a snap, a threaded attachment, a tapered attachment, a spring attachment, and a combination of any two or more of these attachment features. Custom instruments may even be produced by the systems and methods described herein. For example, a particular patient may have a deformity which requires an instrument having a particular angle that is not available in off-the-shelf instruments.

Figure 24:
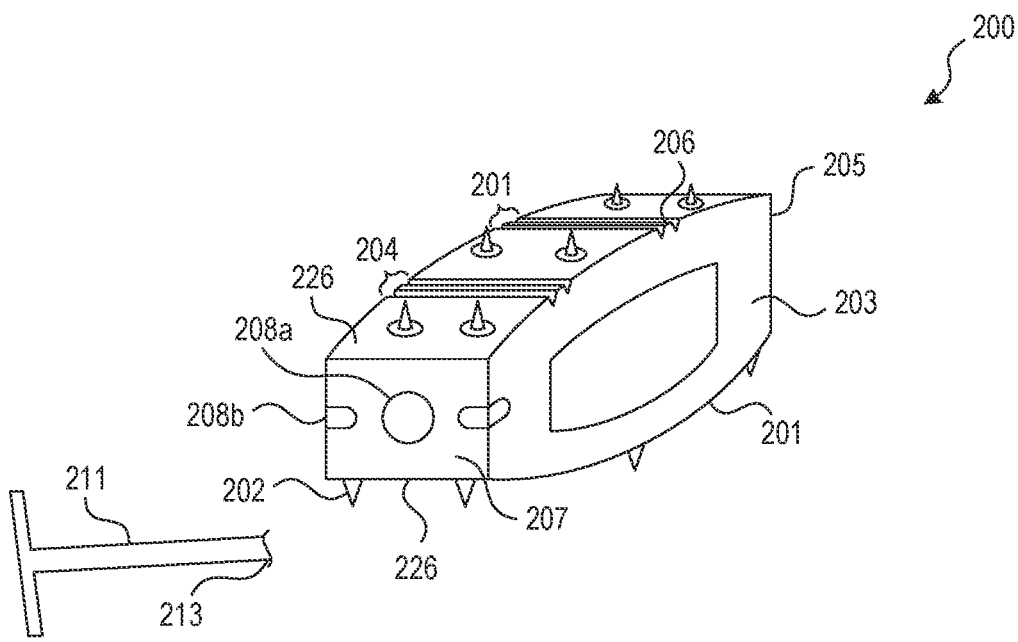
FIG. 24 shows an interbody implant having deployable teeth.

FIG. 24 shows an interbody implant 200 having opposing bone contacting surfaces 201, opposing lateral surfaces 203, an anterior surface 205, and a posterior surface 207. Surfaces 201, 203, 205, 207 form a three-dimensional implant 200. Surfaces 201, 203, 205, 207 can be planar or curved. When curved, the surfaces 201, 203, 205, 207 may each comprise a concave surface or a convex surface. In some embodiments, the surfaces 201, 203, 205, 207 can become contiguous and uninterrupted. In some cases, the cross section can be circular, semi-circular, U-shaped, or C-shaped.

In one embodiment, implant 200 contains static fixation features 204, and dynamic fixation features 202 extending from a base portion 226 of the implant 200. Static teeth 206 are configured to provide temporary fixation between the interbody implant 200 and a first adjacent vertebral body. Dynamic teeth 202 are deployed after delivery of the implant 200 to a desired location within the intervertebral space, and configured to provide fixation to a second adjacent vertebral body. During implantation, implant 200 is inserted into the intervertebral space and adjusted to the location using insertion and adjustment tools. The tools can be designed to mate with features 208a, 208b on the interbody implant 200. Features 208a, 208b may comprise indentations, grooves, ribs, bumps, or other geometric designs to which tools may be engaged.

Figure 25:
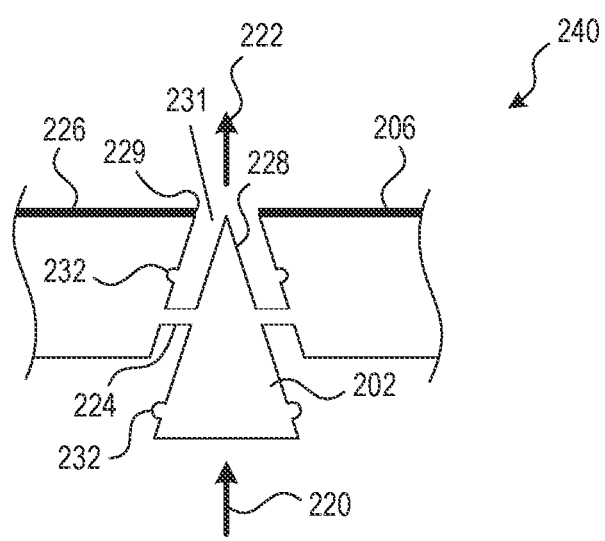
FIG. 25 shows a cross section of the interbody implant at the location of a deployable tooth. In this figure, the tooth is in the un-deployed state.

FIG. 25 shows a cross section of a dynamic tooth 202 in a first position relative to opening 231 (undeployed). In one embodiment, tooth 202 is positioned sub-flush relative the surface of implant 200. Additive manufacturing processes are utilized which enable fabrication of features 230, 232, teeth 202, bridges 224 to create a mechanism that can be optimized to provide dynamic teeth 202. Additive manufacturing processes may include one or more of: three-dimensional printing, vat polymerization, stereolithography (SLA), selective laser melting (SLM), powder bed printing (PP), powder bed fusion, sheet laminarization, material extrusion, selective laser sintering (SLS), selective heat sintering (SHM), fused deposition modeling (FDM), direct metal laser sintering (DMLS), laminated object manufacturing (LOM), laminar deposition, thermoplastic printing, direct material deposition (DMD), digital light processing (DLP), inkjet photo resin machining, and electron beam melting (EBM). These features 230, 232, teeth 202, bridges 224 can be difficult to create and optimize using traditional manufacturing methods (milling, turning, etc.). Additive manufacturing, building parts layer-by-layer, can be used to create features 230, 232, teeth 202, bridges 224 of a mechanism that can be optimized to create, first, a break-away (separation of tooth 202 from the base portion 226 of the implant 200) and, after break-away, a seized relationship between the base portion 226 of the implant 200 and the tooth 202. Another advantage of employing additive manufacturing is the ability to create patient-specific implants that are designed to optimally fit each patient. The implant 200 may include any of the embodiments described herein, or may include embodiments of implants or may incorporate the methods for designing and making implants, such as those disclosed in co-pending U.S. patent application Ser. No. 16/207,116, filed on Dec. 1, 2018, and entitled "Systems and Methods for Multi-Planar Orthopedic Alignment," which is incorporated by reference herein in its entirety for all purposes.

In one embodiment, the teeth 202 can be temporarily affixed to the base portion 226 of the implant body 200 (e.g., via the bridges 224 which extend between each tooth 224 and the base portion 206 of the implant 200). During insertion of the implant 200 into the desired location within the intervertebral space, the tip 228 of each tooth 202 is positioned within recess 229 and opening 231 at or near the surface 206 of the implant 200. In one embodiment, tips 228 of teeth 202 are positioned below the surface 206 of implant 200 (sub-flush). In this embodiment, tips 228 are protected and are not subjected to loads during insertion and positioning of the implant 200. Furthermore, tips 228 can be made sharp and can remain sharp in order to penetrate adjacent anatomy and provide fixation.

Following placement of implant 200 in the desired location, a tool 211 can be used to deploy teeth 202 to a position that is super-flush relative to the surface 206. For example, the tool 211 may have a tip 213 configured to insert into feature 208a to apply a force to cause both separation of the tooth 202 from the base portion 206 of the implant 200, and to cause the tooth 202 to be extended from its flush or sub-flush position (e.g., the first, undeployed position). In some embodiments, an axial force 220 can be delivered to tooth 202 with the tool 221. In some embodiments, the tool 221 may be configured to apply a torque, as does a screwdriver, that in turn places an axial force 220 on the tooth 202. In some embodiments, the tool 221 may be configured to apply a force along an axis extending between two surfaces (e.g., along an axis extending between the anterior surface 205 and the posterior surface 207) in order to release a spring element or other element that transversely applies an axial force 220 on the tooth 202. In use, the axial force 220 causes the tooth 202 to move in an axial direction 222 to extend from the surface 206 and penetrate the adjacent vertebral endplate. In one embodiment, tooth 202 may be connected to implant 200 with a break-away bridge 224 or a series of break-away bridges 224. Axial force 220 can fracture bridge 224 and allow axial translation 222 of tooth 202. Locking features 230, 232 can be positioned on tooth 202 and implant 200 to provide fixation between implant 200 and tooth 202. Locking features 230, 232 may comprise protrusions 230 and indentations 232, configured to fit into each other. In some embodiments, the protrusions 230 may be configured to permanently snap permanently into the indentations 232. In some embodiments, the protrusions 230 may be configured to removably fit into the indentations 232. The protrusions 230, when snapped into the indentations 232 may have a minimum unsnapping force of at least about 50 pounds. In some embodiments, the protrusions 230 and indentations 232 may each have lead-ins (e.g., tapers) that each the snapping of the protrusion 230 into the indentation 232, but not have lead-ins on the opposite sides of the protrusions 230 and indentations 232, such that unsnapping is not possible, or is at least very difficult or requires an unlikely high force to achieve.

Figure 26:
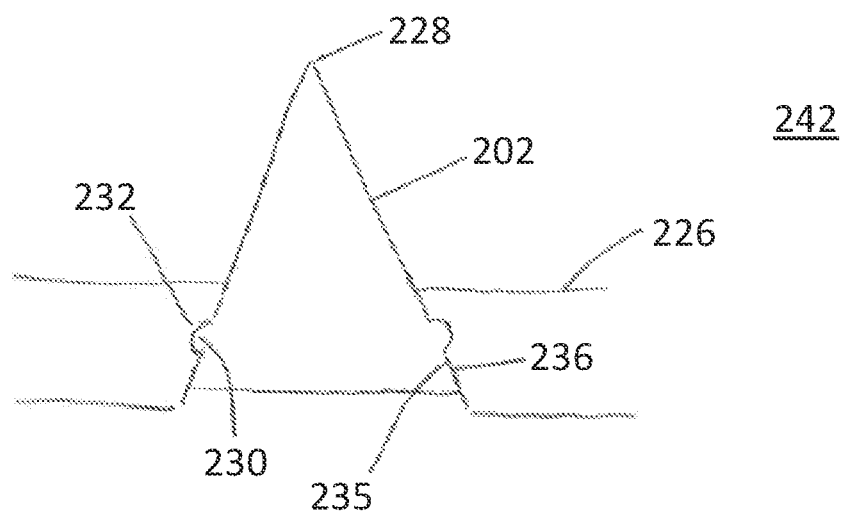
FIG. 26 shows a cross section of the interbody implant at the location of a deployable tooth. In this figure, the tooth is in the deployed state.

FIG. 26 shows a cross section of the tooth 202 in a second position (fully deployed). In one embodiment, tooth 202 is deployed and wedged or engaged into position. The sizing of opening 231 in relation to the tooth 202 is such that the tooth cannot be expulsed from the opening 231. In one embodiment, expulsion of the tooth cannot occur because the opening 231 is smaller than the dimensions at the larger end of tooth 202 (bottom of FIG. 26). Furthermore, the sizing of tooth 202 and opening 231 is such that tooth 202 cannot be permanently disassociated from the implant due to the fit of tooth 202 within opening 231.

The post-deployment relationship between tooth 202 and implant 200 is preserved using interference fits between locking features 230, 232 and/or surfaces 235, 236. In some embodiments, the locking features 230, 232 are absent, and instead, the tooth 202 frictionally engages within the recess 229 (via surfaces 230, 232) at the base portion 226 when the tooth 202 is axially extended. In other embodiments, flash (remaining material) from the broken break-away bridges 224 may provide the slight interference with which the tooth 202 frictionally engages with the recess 229. The features 230, 232 may include bumps, recesses, annual grooves, ridges, rings, incomplete rings, split rings, buttons, springs, or other three-dimensional features to provide secure engagement between tooth 202 and implant 200. Other mechanisms, such as friction, interference, and deformation between surfaces of tooth 202 and opening 231 can seize the relationship between components. In other embodiments, the bridge 224 may comprise a break-away adhesive joint, a break-away tack or weld, or a magnetic coupling. In other embodiments, the bridge 224 may comprise a flexible joint, an over-center mechanism, a linkage, any of which may include a locked condition and an unlocked condition. The locked condition may be the condition when delivered and the unlocked condition may be achieved by the application of a substantially axially-directed force placed upon the tooth 202 or upon the bridge 224 or upon the tooth 202 and the bridge 224. In other embodiments, a non-axially directed force or a moment (e.g., torque) may be applied to the tooth 202 and/or the bridge 224 in order to change the bridge from a locked condition to an unlocked condition.

Interbody 200 can be manufactured of materials typical of medical implants, including, but not limited to, titanium, titanium alloy, Ti6Al4V, polymers, polyether ether ketone (PEEK), etc.

The ranges disclosed herein also encompass any and all overlap, sub-ranges, and combinations thereof. Language such as "up to," "at least," "greater than," "less than," "between," and the like includes the number recited. Numbers preceded by a term such as "approximately," "about," and "substantially" as used herein include the recited numbers (e.g., about 10%=10%), and also represent an amount close to the stated amount that still performs a desired function or achieves a desired result. For example, the terms "approximately," "about," and "substantially" may refer to an amount that is within less than 10% of, within less than 5% of, within less than 1% of, within less than 0.1% of, and within less than 0.01% of the stated amount.

While embodiments have been shown and described, various modifications may be made without departing from the scope of the inventive concepts disclosed herein.

We claim:

1. A computer-implemented method of designing a patient-specific implant system for a patient, the method comprising:
    generating an adjustable virtual three-dimensional model of at least a portion of the spine of the patient;
    receiving one or more user-inputted adjustments to the adjustable virtual three-dimensional model to provide one or more patient-specific corrections to the patient's spine;
    mapping, using the adjustable virtual three-dimensional model showing the one or more patient-specific corrections, a negative space between a first vertebral body endplate and a second vertebral body endplate, wherein the negative space includes contouring corresponding to patient-specific contouring of the first vertebral body endplate and the second vertebral body endplate; and
    designing a patient-specific implant system configured to provide the one or more patient-specific corrections when implanted in the patient, the patient-specific implant system including
        a base configured to be implanted between the first vertebral body endplate and the second vertebral body endplate and having a shape corresponding to the mapped negative space such that the base comprises a first bone contacting surface having a first patient-specific shape corresponding to the patient-specific contouring of the first vertebral body endplate and a second bone contacting surface having a second patient-specific shape corresponding to the patient-specific contouring of the second vertebral endplate; and
        a deployable fixation element configured to provide fixation between the base and at least one of the first or second vertebral body endplates.

2. The computer-implemented method of claim 1 wherein the patient-specific correction includes a linear displacement of the patient's spine.

3. The computer-implemented method of claim 1 wherein the patient-specific correction includes a rotation of the patient's spine.

4. The computer-implemented method of claim 1 wherein the patient-specific correction includes a correction of at least one of a coronal, sagittal, or axial plane deformity.

5. The computer-implemented method of claim 1 wherein generating the adjustable virtual three-dimensional model includes converting two-dimensional image data of the patient's spine into the adjustable virtual three-dimensional model.

6. The computer-implemented method of claim 1 wherein the deployable fixation element includes a plurality of deployable teeth.

7. The computer-implemented method of claim 1 wherein the deployable fixation element includes a screw.

8. The computer-implemented method of claim 1 wherein the base includes a channel extending at least partially therethrough, and wherein the deployable fixation element is configured to advance through the channel to provide fixation between the base and the at least one of the first or second vertebral endplates.

9. The computer-implemented method of claim 1, wherein the patient-specific implant system further comprises a locking mechanism configured to lock the deployable fixation element in a deployed position.

10. The computer-implemented method of claim 1, further comprising generating fabrication instructions for manufacturing the patient-specific implant system.

11. A method of designing a patient-specific interbody implant system for a patient, the method comprising:
    non-invasively determining a patient-specific correction for the spine of the patient by adjusting a virtual three-dimensional model of at least a portion of the spine of the patient; and
    mapping, using the adjusted virtual three-dimensional model showing the patient-specific correction, a negative space between a first vertebral body endplate and a second vertebral body endplate the spine of the patient, wherein the negative space includes contouring corresponding to patient-specific contouring of the first vertebral body endplate and the second vertebral body endplate; and
    designing a patient-specific interbody implant system based at least in part on the adjusted virtual three-dimensional model and configured to provide the patient-specific correction when implanted in the spine of the patient, the patient-specific interbody implant system comprising:
        a base configured to be implanted between the first vertebral body endplate and the second vertebral body endplate and having a shape corresponding to the mapped negative space such that the base comprises a first bone contacting surface having a first patient-specific shape corresponding to the patient-specific contouring of the first vertebral body endplate and a second bone contacting surface having a second patient-specific shape corresponding to the patient-specific contouring of the second vertebral body endplate; and a deployable fixation element configured to provide fixation between the base and at least one of the first or second body vertebral endplates.

12. The method of claim 11, further comprising manufacturing the patient-specific interbody implant system.

13. The method of claim 11 wherein the patient-specific correction includes a linear displacement of the patient's spine.

14. The method of claim 11 wherein the patient-specific correction includes a rotation of the patient's spine.

15. The method of claim 11 wherein the patient-specific correction includes a correction of a coronal, sagittal, and/or axial plane deformity.

* * * * *